US006982640B2

(12) United States Patent
Lindsay et al.

(10) Patent No.: US 6,982,640 B2
(45) Date of Patent: Jan. 3, 2006

(54) RFID SYSTEM AND METHOD FOR TRACKING FOOD FRESHNESS

(75) Inventors: Jeff Lindsay, Appleton, WI (US); Walter C. Reade, Appleton, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 105 days.

(21) Appl. No.: 10/301,883

(22) Filed: Nov. 21, 2002

(65) Prior Publication Data

US 2004/0100380 A1 May 27, 2004

(51) Int. Cl.
*G08B 21/00* (2006.01)

(52) U.S. Cl. .................. 340/540; 340/572.1; 340/10.1
(58) Field of Classification Search ............... 340/540, 340/572.1–572.9, 10.1, 692, 10.51; 235/462.01
See application file for complete search history.

(56) References Cited

U.S. PATENT DOCUMENTS

| | | | |
|---|---|---|---|
| 5,361,070 A | 11/1994 | McEwan | 342/21 |
| 5,380,991 A | 1/1995 | Valencia et al. | 235/383 |
| 5,677,927 A | 10/1997 | Fullerton et al. | 375/200 |
| 5,687,169 A | 11/1997 | Fullerton | 370/324 |
| 5,711,160 A * | 1/1998 | Namisniak et al. | 62/125 |
| 5,727,153 A | 3/1998 | Powell | 395/214 |
| 5,798,694 A * | 8/1998 | Reber et al. | 340/540 |
| 5,832,035 A | 11/1998 | Fullerton | 375/210 |
| 5,942,977 A * | 8/1999 | Palmer et al. | 340/572.5 |
| 5,955,969 A | 9/1999 | D'Hont | 340/928 |
| 5,990,794 A * | 11/1999 | Alicot et al. | 340/573.1 |
| 6,037,879 A | 3/2000 | Tuttle | 340/825.54 |

(Continued)

FOREIGN PATENT DOCUMENTS

| | | |
|---|---|---|
| DE | 29714999 | 11/1997 |
| DE | 19742126 | 3/1999 |
| WO | WO 0215073 A1 | 2/2002 |
| WO | 0215073 | 2/2002 |
| WO | WO 0248955 A1 | 6/2002 |
| WO | 02080060 | 10/2002 |
| WO | WO 02080060 A1 | 10/2002 |
| WO | WO 0065532 A1 | 11/2002 |

OTHER PUBLICATIONS

"Theory, History, and the Advancement of Parametric Loudspeakers: A Technology Overview", by James J. Croft and Joseph O. Norris, Revision D, American Technology Corporation, San Diego, CA 2002. Available at http://www.atcsd.com/pdf/HSSWHTPAPERRevE.pdf.

Popular Science, What's New, Suzanne Kantra Kirschner, We've heard hypersonic sound. It could change everything. Exemplary applications of hypersonic technology are illustrated at www.popsci.com/popsci/hometech/article/0,12543,351353,00.html.

(Continued)

*Primary Examiner*—Phung Nguyen
(74) *Attorney, Agent, or Firm*—Dority & Manning (57) ABSTRACT

A method is provided for tracking the freshness or expiration dates of food products put into storage. The food products placed into storage are provided with smart tags, the smart tags containing food product information regarding the freshness or expiration date of the food product. The food products are scanned with a smart tag scanner prior to placing the products into storage, the scanner configured to retrieve the food product information from the smart tags. The user may be alerted if the retrieved information indicates that the food product being placed into storage has expired or is no longer fresh. The food products are placed in storage, and the user may be alerted when any of stored products have expired or are no longer fresh.

45 Claims, 4 Drawing Sheets

U.S. PATENT DOCUMENTS

| | | | |
|---|---|---|---|
| 6,177,903 B1 | | 1/2001 | Fullerton et al. ............. 342/28 |
| 6,195,006 B1 | * | 2/2001 | Bowers et al. ........... 340/572.1 |
| 6,218,979 B1 | | 4/2001 | Barnes et al. .................. 342/28 |
| 6,226,619 B1 | | 5/2001 | Halperin et al. ................ 705/1 |
| 6,294,997 B1 | * | 9/2001 | Paratore et al. .......... 340/572.1 |
| 6,429,768 B1 | | 8/2002 | Flick .......................... 340/502 |
| 6,446,049 B1 | | 9/2002 | Janning et al. ................ 705/40 |
| 6,451,154 B1 | | 9/2002 | Grabau et al. .............. 156/300 |
| 6,491,217 B2 | | 12/2002 | Catan .......................... 235/375 |
| 6,507,279 B2 | * | 1/2003 | Loof ........................ 340/572.1 |
| 6,693,511 B1 | | 2/2004 | Seal .......................... 340/10.1 |
| 6,693,539 B2 | | 2/2004 | Bowers et al. ........... 340/572.1 |
| 2002/0040321 A1 | | 4/2002 | Nicholson |
| 2002/0070862 A1 | | 6/2002 | Francis et al. |

OTHER PUBLICATIONS

D. McFarlane, "Auto–ID Based Control," White Paper for the Auto–ID Centre Institute for Manufacturing, University of Cambridge, Cambridge, United Kingdom, Feb. 1, 2002, Available at http//www.autoidcenter.org/research/CAM–AUTOID–WH–004.pdf.

Chien Yaw Wong, "Integration of Auto–ID Tagging System with Holonic Manufacturing Systems," White Paper for the Auto–ID Centre Institute for Manufacturing, University of Cambridge, Cambridge, United Kingdom, Sep. 2001. Available at www.autoidcenter.org/research/CAM–WH–001.pdf.

Wincor Nixdorf, Member of METRO Group, Future Store Initiative, "Store Vision—High–Tech for the Future in Retail," Wincor Vision May 2003. Available at http:/www.wincor–nixdor.com/internet/com/Idustries/Retail/Wincor-Vision/WincorVisionSpezialFSI,templateId=blob.jsp.property=Data.pdf.

M&S Pilots RFID System For Fresh Food Operation . . . , Ready Meals info, Press Releases Nov. 20, 2001 2:30:23 PM http://www.readymealsinfo.com/resources/results.asp?txt-Content=3459.

RFID Journal, Found at: http:216.121.131.129/article/articleprint/22/–1/1/Auto–ID Center Opens Demo Lab The center today opened a robotic demonstration lab at its facility in Cambridge, England, to show off RFID's manufacturing capabilities. Jul. 11, 2002 http://www.rfidjournal.com/article/articleprint/22/–1/1.

Electronic ID, Inc., Destron–Fearing Applications—Companion Animals http://www.destronfearing.com/elect/compan.html.

Ariana Eunjung Cha, Washington Post, Monday, Jun. 24, 2002, SFGate.com, Shops try chips for tracking every move by client 'tribe' Monitoring systems note what catches customers' eyes, URL: sfgate.com/article.cgi?file=/c/a/2002/06/24/BU147064.DTL http://www.sfgate.com/cgi?bin/article.cgi?file=/c/a/2002/06/24/BU147064.DTL&type=pri . . . .

Kevin Maney, USA Today, New chips could make everyday items 'talk' Apr. 11, 2002—Updated 10:34 PM ET WWW.USATODAY.COM http://www.usatoday.com/tech/news/2002/04/12/tinyband.htm.

Forbes.com—Magazine Article, Chana R. Schoenberger The internet of things, Mar. 18, 2002 http://www.forbes.com/global/2002/0318/092_print.html.

Alia Ahmad Zaharudin, Chien Yaw Wong, Vivek Agarwal, Duncan McFarlane, Robin Koh, Yun Y. Kang, "The Intelligent Product Driven Supply Chain," White Paper for the Auto–ID Centre Institute For Manufacturing, University of Cambridge, Cambridge, United Kingdom, Published Feb. 1, 2002. Distribution restricted to Sponsors until May 1, 2002. Available at www.autoidcenter.org/research/cam–wh–005.pdf.

David L. Brock, "Smart Medicine The Application of Auto–ID Technology to Healthcare," White Paper for the Auto–ID Center Massachusetts Institute of Technology, Cambridge, MA, USA, Published Feb. 1, 2002. Distribution restricted to Sponsors until May 1, 2002. Available at www.autoidcenter.org/research/mit–autoid–wh–010.pdf.

Amskan Editorials, RFID Overview: The science of evaluating RFID (Radio Frequency Identification) Technology, AMSKAN Update: Jan. 1999. Available at www.amskan.com/html/rfid_overview.html.

Ludwig Weimann and Junru Wu Transdermal Drug Delivery by Sono–Macroporation http://ultra–sonictechnologies.com/cancun–presentation.htm Nov. 4, 2003 11:28:14 AM.

Advertisement—WWW.MOBILECLOAK.COM—mCloak—RFID Tolltags etc. Copyrighted—2002.

Advertisement—WWW.MOBILECLOAK.COM—RFID Tags Copyrighted—2002.

Ultra–Wideband Technology for Short– or Medium–Range Wireless Communications Copyrighted—2001 Intel Corporation.

Ultra Wideband: The Ultimate Disruptive Technology WWW.ULTRAWIDEBANDPLANET.COM—Jun. 11, 2002—Int Media Group.

U.S. Approves Ultra–Wideband Technology WWW.WIRELESSNEWSFACTOR.COM—Feb. 15, 2002.

New Public Safety Applications and Broadband Internet Access Among Uses Envisioned by FCC Authorization of Ultra–Wideband Technology Federal Communications Commission—Feb. 14, 2002.

Ultra Wideband—Searchnetworking.com Copyrighted 2000–2002—Techtarget.

Internet Article—www.TIMEDOMAIN.COM –PulsON Technology Capabilities Sep. 3, 2002.

White Paper—Integration of Auto–ID Tagging System with Holonic Manufacturing Systems—Cambridge University Auto–ID Center Published Sep. 1, 2001.

Auburn University—Detection & Food Safety Center—Audfs.Eng.Auburn.Edu, Sep. 4, 2002.

Internet Article—Smart Tags Indicate Freshness—Courses. Che.Umn.Edu, Sep. 4, 2002.

Internet Article—WWW.AIMGLOBAL.ORG—Pharmaceutical Distributor Cuts Day of Safety Stock Aug. 29, 2002.

Internet Article WWW.IDTECHEX.COM—Independent Market, Strategic and Technology Reports Aug. 29, 2002.

Internet Article—WWW.READYMEALSINFO.COM—M&S Pilots RFID System for Fresh Food Operation Sep. 4, 2002.

Internet Article—Audfs.Eng.Auburn.Edu—Auburn University Detection & Food Safety Center Sep. 4, 2002.

RFID Journal—Internet Article—WWW.RFIDJOURNAL.COM—Auto–ID Center Opens Demonstration Lab in the U.K. Sep. 4, 2002.

Internet Article—WWW.AUTOIDCENTER.ORG—Transmitting ePC Codes Aug. 26, 2002.

Internet Article—WWW.ELECTRONICIDINC.COM—Destron–Fearing Electronic ID Background Sep. 4, 2002.

Internet Article—Destronfearing.com—Applications–Companion Animals Sep. 4, 2002.

Internet Article—Audfs.Eng.Auburn.Edu—Auburn University—Detection & Food Safety Center Sep. 4, 2002.

Internet Article—Sfgate.Com—Shops Try Chips for Tracking Every Move by Client 'Tribe' Monitoring Systems Note What Catches Customers' Eyes Aug. 6, 2002.

Internet Article—WWW.AIMGLOBAL.ORG—Radio Frequency Identification—RFID A Basic Primer Sep. 28, 1999.

Internet Article—WWW.AIMGLOBAL.ORG—Common Applications—RFID Jul. 23, 2002.

Internet Article—WWW.USATODAY.COM—New Chips Could Make Everyday Items 'Talk' Jul. 23, 2002.

Forbes Magazine—The Internet of Things Mar. 18, 2002.

Auto–ID Center—Institute for Manufacturing, University of Cambridge—White Paper—Auto–ID Based Control—An Overview Feb. 1, 2002.

Wireless Handhelds—Beam up Some Information, Scotty, Control Engineering May, 2002.

Scientific American—Wireless Data Blaster May, 2002.

Auto–ID Center, Institute for Manufacturing, University of Cambridge, White Paper—The Intelligent Product Driven Supply Chain Feb. 1, 2002.

Auto–ID Center Massachusetts Institute of Technology—White Paper—Smart Medicine—The Application to Auto–ID Technology to Healthcare Feb. 1, 2002.

U.S. Appl. No. 10/301,513, filed Nov. 21, 2002.

U.S. Appl. No. 10/301,879, filed Nov. 21, 2002.

U.S. Appl. No. 10/301,882, filed Nov. 21, 2002.

U.S. Appl. No. 10/301,877, filed Nov. 21, 2002.

U.S. Appl. No. 10/301,846, filed Nov. 21, 2002.

U.S. Appl. No. 10/301,549, filed Nov. 21, 2002.

* cited by examiner

RFID SYSTEM AND METHOD FOR TRACKING FOOD FRESHNESS

TECHNICAL FIELD

The present invention relates generally to the field of food storage, and more particularly to a system and method for tracking the freshness or expiration dates of food products.

BACKGROUND

Radio Frequency Identification Devices (RFIDs) are low-cost, passive or active "smart" chips or "tags" that can be embedded in or attached to articles, products, and the like, to convey information about the product via a scanner. The smart tags are generally small label-like devices with a micro-chip and miniature embedded antennae. The tags may be passive or active, the active tags requiring an internal power supply. A reader or scanner interrogates the smart tag with an electronic signal. In response to this signal, the tag in turn generates an electromagnetic pulse response that is readable by the scanner, the response containing the product information. RFID smart tags can be embedded in or attached to product packaging, or incorporated directly into the product, and may convey conventional "bar code" information, as well as other more detailed information.

Various commercial applications have been suggested for smart tags, particularly in the area of retail marketing and sales. For example, RFID technology may be used to gather information related to consumer trends, purchasing habits, consumption rates, etc. RFID technology has been touted for uses such as inventory control, manufacturing process and control, product accountability and shipping systems, etc. Manufacturers, shippers, and retailers may be able to follow a given product through their respective systems from initial production through to point of sale. It has been suggested that other applications may include shopping carts that automatically charge a bank account, refrigerators that tap into the Internet to automatically reorder items that are running low, and interactive televisions linked to such refrigerators that could feed targeted commercials and special offers to consumers. (See, "They Know What You Eat," by Kayte VanScoy, Smart Business, January 2001).

The present invention relates to a novel implementation of RFID technology in the field of food product storage.

Many types of food products have a limited freshness period or "shelf life" before they spoil or loose their nutritional value. For example, refrigerated dairy products such as milk, eggs, and cheese, have a fairly short "freshness" period before they spoil. Food products such as fresh vegetables and fruits should be consumed within a short time period. Baked goods are only "fresh" for a limited time. Other food products, such as many types of frozen foods, have a much longer shelf life, but it is still recommended that they be consumed prior to a particular date. Even many types of dry goods will spoil in time.

The food industry provides consumers with "freshness" or "expiration" dates for products, but such information is generally conveyed only through labels or indicia printed on the product packing. Although this method may be sufficient for informing the consumer if the product they are about to purchase is still "fresh," it offers little benefit once the products are placed in the consumer's refrigerator, pantry, or other food storage location. The printed freshness or expiration date indicia is notorious for "disappearing" from many types of products, particularly refrigerated or frozen products, or the dates/labels are inconspicuously located on the products and require a concerted effort to locate. This is inconvenient, and in certain cases, impossible for many individuals with impaired sight or who cannot otherwise read or comprehend the printed information (illiteracy, different native tongue, etc). In many instances, the original product packaging containing the information is discarded. Consider the common practice of consumers repacking bulk products such as meat, fresh vegetables, etc., into smaller portions prior to freezing or otherwise storing. The experience of sorting through one's refrigerator/freezer, pantry, etc., to determine what products are actually present and, if present, what products are spoiled or expired is an all too common experience for homemakers, restaurants, hospitals, and virtually any food service business.

The present invention provides a RFID system and methodology that addresses at least certain of the drawbacks discussed above and may greatly facilitate food product storage for consumers from the standpoint of product freshness, expiration, accountability, and the like.

SUMMARY

Objects and advantages of the invention will be set forth in the following description, or may be obvious from the description, or may be learned through practice of the invention.

A methodology and system according to the invention involves, in general aspects, the incorporation of smart tags with the packaging or containers in which food products are stored, the smart tags being programmed with or associated with food product information including freshness date, expiration date, date made or prepared, and so forth. The system includes a smart tag scanner/receiver placed conveniently at a food product storage location (e.g., refrigerator/freezer or pantry). The scanner "interrogates" the smart tags prior to the food product being placed for storage (or as the product is placed in storage, of after it is placed in storage), and the coded information is made available to the consumer or other interested party (e.g., a grocer).

The scanner may be integrated with a computer system wherein the information may, for example, be entered and used to track the stored food products and perform any number of associated functions. For example, the system may issue an alert (visible, audible, or the like) when a stored product has expired or exceeded a pre-determined freshness date. The system may sort and display a readout of the stored products by date entered into storage, manufacturer's suggested expiration date, food group, date purchased, or any other desired criteria. The system may be interactive, wherein a user may edit or replace data stored in the smart tags (in which case the tags would be "active" tags). The system may provide the consumer with coded links to databases containing additional information on the stored products. For example, the smart tags may provide a URL code for the consumer to access an Internet web site concerning the food product.

The smart tags may include any manner of additional information related to the food products. For example, the food product information may include the ingredients of the food product, storage instructions, preparation instructions, dietary and nutritional information, recipes, and so forth. This information can be directly encoded in the chip or can be accessible using an electronic product code in the chip, which code can then be used as a pointer to receive associated product information in a database. For example, a "savant" server can be used to access a product database using the electronic product code, and can then return the product information for use in the present invention.

The system and method according to the invention are not limited to any particular type or configuration of food storage "location." For example, the location may be a refrigerator, freezer, pantry, closet, shelving unit, storage room, and generally any physically defined location in which food products are stored. The scanner is desirably disposed at a convenient location relative to the storage location, e.g., at the entry of the food product storage location. For example, if the location is a refrigerator or a freezer, the scanner may be disposed on or configured in the door of such unit. The scanner is disposed so as to be within range of the food products that are brought into and taken out of the storage location. The scanner may include, or be configured with, any manner of visual display screen, audible or visual alarm, printer, and so forth.

In one particular configuration, the smart tag scanner is functionally integrated with a computer system. The computer system provides the user with a variety of options based on the food product information retrieved from the smart tags. For example, the computer may provide the capability to sort the food products by date, such as expiration date or date entered into the food storage location, the date the product was purchased, or the date in which a portion of the food product was removed or used. With the computer, the consumer may be able to sort and display the stored products by type of food group. Further, food items may be automatically positioned or provided for use based on the age of the food items, as determined by the RFID-based food freshness system, such that the oldest still acceptable items are used first to help reduce the risk of food items going to waste. In related embodiments, food items are retrieved or offered for use based on customized rules governing food freshness and application. For example, certain dishes offered in restaurant may require fresher or more aged ingredients, and the system of the present invention can automatically provide or recommend food items of appropriate age for the particular dish; similar principles can be used to provide food items of suitable age or freshness for particular customers, occasions, and the like.

For embodiments wherein the smart tags are active tags, additional capabilities are possible. With active tags, the consumer may add or delete information from the tags via an interactive transmitter/receiver. The transmitter/receiver may be integrated with a computer system. Such information may include, for example, the date the food product was actually purchased or placed into the storage location. In this scenario, the business unit, e.g. a supermarket, may include a transmitter/receiver unit at the point of checkout that automatically loads information such as purchase date, price, etc., into the smart tags as the food products are scanned for checkout.

In an alternate embodiment of the method and system according to the invention, the smart tags are provided or attached to containers in which food products are stored. For example, such containers may include reusable/resealable plastic containers (e.g. Tupperware® containers), freezer bags, coolers, and the like. In this scenario, the smart tags would be active tags and the consumer would enter the food product information in the tags upon placing the food in the containers and placing the containers into storage. Virtually any type of information related to the food products may be entered by the consumer.

In a related embodiment, a system according to the present invention may comprise each the following:

an RFID tag comprising an RFID code associated with (e.g., containing or capable of serving as a pointer to) product information for the item, the RFID tag being associated with (e.g., attached to the item or its container) the item in the storage location;

an RFID scanner cooperatively associated with the storage location adapted for scanning the RFID code from the smart tag and retrieving the associated product information;

a processor (e.g., a computer or microprocessor) associated with data storage means (e.g., a hard disk, tape drive, writable compact disk, or other electronic memory means) for recording storage information pertaining to the item (e.g., starting time of storage, temperature of storage, duration of storage);

means for comparing the storage information with predetermined criteria (e.g., freshness requirements based on or contained in the product information) for the item to determine the freshness state of the item;

means for automatically recommending or causing an action to be taken with the item responsive to the freshness state of the item (e.g., an alert to indicate that the product needs to be used or discarded, or an automatic lowering of storage temperature to better preserve the item); and means for a consumer to review storage-related information comprising at least a subset of the recorded storage information or the freshness state information derived from the storage information.

The system may be adapted to track the freshness of any number of items, each with its own smart tag. The storage location may be refrigerated, such as a meat locker, refrigerated shelves in a grocery store, a refrigerated truck, and a household refrigerator in a dwelling place. The item may comprise raw meat, fish, poultry, medication, eggs, dairy products, and the like.

The means for a consumer to review storage-related information may comprise a consumer-operated RFID scanner adapted for scanning a product RFID tag associated with a product comprising or derived from the item, the product RFID tag comprising information associated with the storage-related information. The RFID scanner can be cooperatively associated with (e.g., may be attached to, or contain, or provide remote access to) display means for displaying the storage-related information. The storage related information can include storage times, temperature of storage (means and extremes, or other statistics), and can also be combined with secondary information such as calculated hypothetical bacterial growth rates for the recorded storage times and conditions. The storage-related information can also be coupled with product information from any raw materials used in the food item. In one embodiment, storage history since manufacturing or initial preparation of a food item can be reviewed by a consumer to allow a more informed decision to be made about food freshness.

Additional aspects of the present methodology and system will be described below with reference to the figures.

DETAILED DESCRIPTION

Reference will now be made in detail to one or more embodiments of the invention, examples of which are graphically illustrated in the drawings. Each example and embodiment are provided by way of explanation of the invention, and not meant as a limitation of the invention. For example, features or described as part of one embodiment may be utilized with another embodiment to yield still a further embodiment. It is intended that the present invention include these and other modifications and variations.

Figure 1:
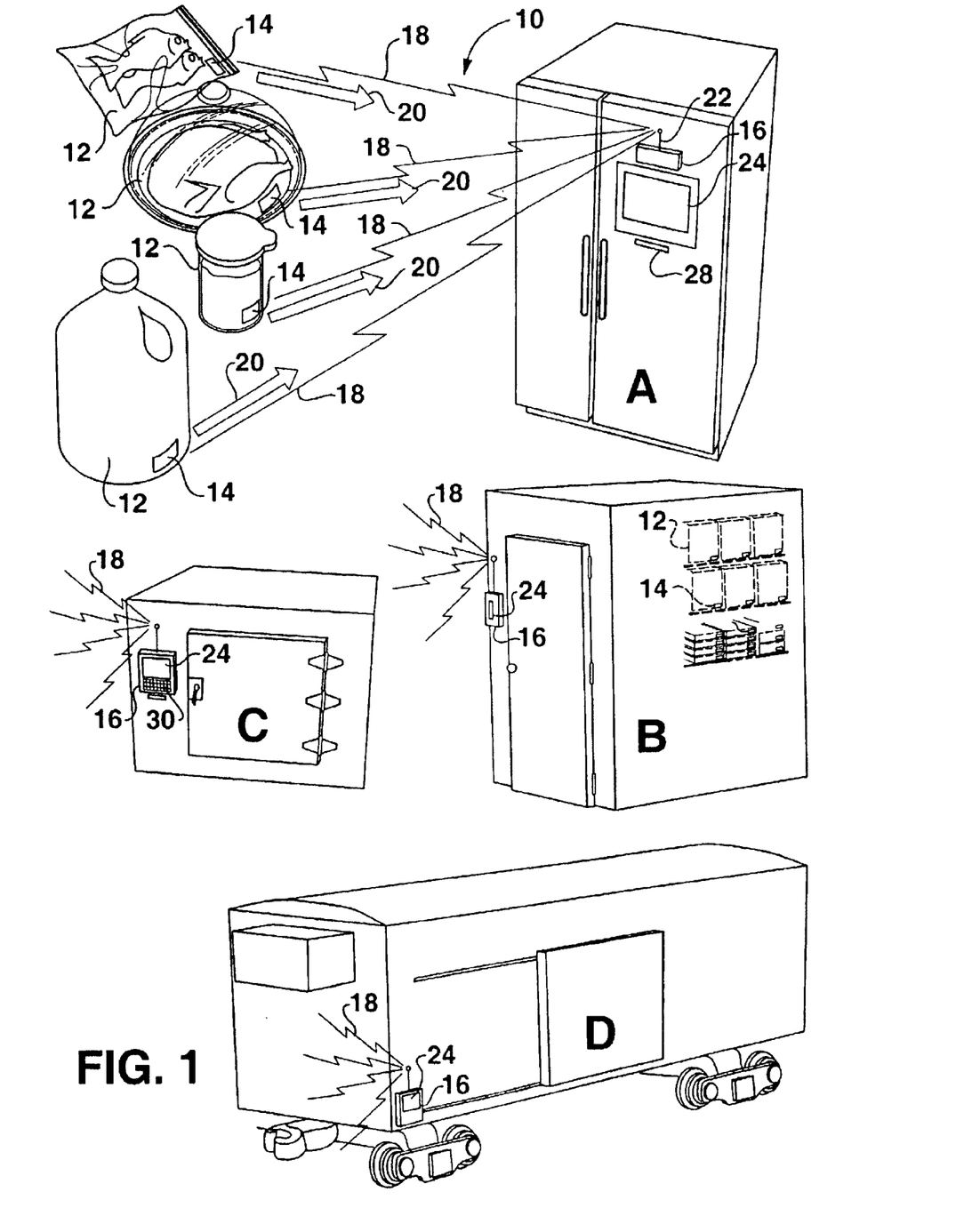
FIG. 1 is a graphic illustration of conceptual scenarios according to a method and system of the invention.

FIG. 1 graphically illustrates conceptual aspects of a method and system 10 according to the invention. Any variation of food products 12 are provided with a smart tag 14. As discussed in greater detail below, the tags 14 transmit a pulse 20 of coded food product information in response to an electronic "trigger" signal 18 from a scanner 16. The invention is not limited to any particular type of food product, and may include, for example, dry boxed goods, liquids juices, milk, etc.), fresh foods, frozen foods, and so forth. It should be appreciated that "food products" also includes repackaged foods, as well as precooked or prepared meals, and the like. Any type of food product that must be stored for a period of time is within the scope and spirit of the invention.

The smart tags 14 may be provided on the packaging of the food products or on the containers in which the food products are stored. For example, referring to FIG. 1, in certain embodiments, the tags 14 may be separately provided for attachment to reusable storage containers, such as conventional resealable plastic containers, freezer bags, coolers, and so forth. In alternate embodiments, the tags 14 may be permanently or non-removably attached to the packaging or containers in which the food products are commercially distributed or sold. For example, a tag 14 may be non-removably embedded in a plastic milk carton. In an alternate embodiment, a tag 14 may be embedded in a disposable tray or absorbent pad used for packaging meat products. It should be appreciated that the tags 14 may be "associated" with the food products in any manner.

It should also be appreciated that the method and system 10 according to the invention is not limited to any particular type of food storage unit or location. For example, referring to FIG. 1, scenario "A" is a conventional refrigerator incorporating a smart tag scanner 16 that scans the food products 12 as they are placed into or removed from the refrigerator. Scenario "B" represents a typical pantry for storing non-refrigerated items. A scanner 16 may be conveniently located at the door or entrance of the pantry. Scenario "C" illustrates a commercial walk-in refrigerator/freezer unit. The scanner 16 may be conveniently located alongside the door of the unit. Scenario "D" represents a refrigerated railroad car. The scanner 16 is located near the doors of the car. It should be appreciated that any food storage location wherein food products are stored over a period of time are within the scope and spirit of the invention.

The food product information contained by the smart tags 14 is not limited in scope, but desirably at least includes information relating to the "freshness" of the food product. This information may include an expiration date as suggested by the supplier or manufacturer of the food product, the date in which the product was prepared, the date the product was purchased by a consumer, the date the product was placed into storage, and so forth. For example, for conventional pre-cooked frozen entrees or other dishes, the smart tag may contain the date the entree was actually prepared and frozen. The preparation date may actually be quite some time prior to the date a consumer actually purchases the item, and this information may be important to certain consumers. For fresh vegetables, fruits, and so forth, the date the food products were harvested or picked may be important to consumers. For baked goods, the day on which the goods were baked and packaged may be relevant in addition to the expiration or "freshness"date suggested by the bakery or supplier.

In addition to freshness or expiration information, the food product information may include, for example, information about ingredients contained in the food product, the nature and quantity of any preservatives and artificial colors, sodium levels, cholesterol content, sugar level, nutritional and dietary information, the presence of animal products or by-products, yeast content, genetically modified material content, kosher status, the presence of dairy goods, and so forth.

The scanners 16 are conveniently disposed relative to the food storage locations so that the food products 12 are scanned as they are placed into or removed from storage. The scanners 16 are configured to retrieve and decode the food product information signal 20 from the smart tags 14. With conventional RFID "smart systems" wherein the smart tags 14 are passive devices, the scanner 16 emits the trigger excitation signal 18 received by an internal antennae in the smart tag 14. This signal 18 causes the smart tag 14 to generate and transmit an electromagnetic pulse containing the coded food product information signal 20. The coded signal 20 is received by the receiver antennae 22, decoded, and the food product information is presented to the consumer in various ways, as described in greater detail below.

RFID smart tag technology is known and understood by those skilled in the art, and a detailed explanation thereof is not necessary for purposes of describing the method and system according to the present invention. Generally, conductive or passive smart tags 14 consist of a semiconductor, a coiled, etched, or stamped antennae, a capacitor, and a substrate on which the components are mounted or embedded. A protective covering is typically used to encapsulate and seal the substrate. Inductive or passive smart tags have been introduced by Motorola under the name "BiStatix". A detailed description of the BiStatix device may be found in U.S. Pat. No. 6,259,367 B1, incorporated herein by reference in its entirety for all purposes. Another commercial source of suitable smart tags is Alien Technology Corporation of Morgan Hill, Calif. , under the technology name FSA (Fluidic Self-Assembly). With the FSA process, tiny semiconductor devices are assembled into rolls of flexible plastic. The resulting "smart" substrate can be attached or embedded in a variety of surfaces. The smart tag technology under development at the Auto-ID Center at Massachusetts Institute of Technology (Cambridge, Mass.) can also be used within the scope of the present invention. Further information on smart tags and related technology is disclosed in U.S. Pat. No. 6,451,154, "RFID Manufacturing Concepts," issued Sep. 17, 2002 to Grabau et al.; U.S. Pat. No. 6,354, 493, "System and Method for Finding a Specific RFID Tagged Article Located in a Plurality of RFID Tagged Articles," issued Mar. 12, 2002 to Mon; PCT publication WO 02/48955, published Jun. 20, 2002; U.S. Pat. No. 6,362,738, "Reader for Use in a Radio Frequency Identification System and Method," issued Mar. 26, 2002 to Vega; D. McFarlane, "Auto-ID Based Control,"White Paper for the Auto-ID Centre Institute for Manufacturing, University of Cambridge, Cambridge, United Kingdom, Feb. 1, 2002, available at http://www.autoidcenter.org/research/CAM-AUTOID-WH-004.pdf; and Chien Yaw Wong, "Integration of Auto-ID Tagging System with Holonic Manufacturing Systems," White Paper for the Auto-ID Centre Institute for Manufacturing, University of Cambridge, Cambridge, United Kingdom, September 2001, available at http://www.autoidcenter.org/research/CAM-WH-001.pdf.

Other RFID technologies believed to be of value for the present invention include those produced by Microchip Technologies (Chandler, Ariz.), which provides remote read-write chips at several frequencies. Also of potential value are the I*CODE chips and readers of Philips Semiconductor (Eindhoven, The Netherlands), which, in one embodiment, are said to include 384 bit configurable read/write memory with 64 bits for a unique serial number (e.g., an electronic product code). Sokymat (Lausanne, Switzerland) markets the PICCOLO read-only RFID disc tag which transmits data to a reader station by an AM radio signal. The tag is said to have 64 bits of data that can be programmed during manufacturer by laser fusing of polysilicon links in order to store a unique code on each tag.

Texas Instruments (Dallas, Tex.) offers RFID technology as part of Texas Instruments RFID (TI*RFID™) Systems, formerly known as the TIRIS© system (Texas Instruments Registration and Identification System), which is used to track and identify various assets using devices such as the TI Tag It™ chip.

Gemplus (Gemenos, France) provides smart tags (sometimes called "smart labels") and smart cards employing RFID technology, which may be used as smart tags. They also market interfaces, antennas, scanners and software that can be adapted for use with smart tags.

Nedap (Groenlo, The Netherlands) provides smart cards and a 13.56 MHz smart tag using RFID technology with 512 bits of read-write memory with a range of about 120 cm. It is claimed that about 20 such tags per second can be read successfully by a scanner.

Checkpoint Systems Inc. (Miami, Fla.) offers a smart tag with WORM technology (write once, read many). One example is the MCRF355 chip, described more fully at http://www.idsystems.com/reader/1999_05/join0599.htm.

PDA-like reader systems and other portable readers for RFID technology are marketed by Omron Company (Tokyo, Japan), such as the Model V700 or V720 series.

High frequency bands can be used in RFID technology, such as bands between 300 MHz and 10 GHz. SCS Corporation (Rancho Bernardo, Calif.), for example, markets smart tag technology at 2.45 GHz. Ultra-wide band technology can also be adapted for RFID systems.

A related technology within the scope of the present invention is Surface Acoustic Wave (SAW) technology. For example, InfoRay (Cambridge, Mass.) markets a passive smart tag that is said to achieve long ranges (up to 30 meters) using a Surface Acoustic Wave (SAW) device. On a chip coupled with an antenna. The SAW device converts a radio signal to an acoustic wave, modulates it with an ID code, then transforms it to another radio signal that is emitted by the smart tag and read by a scanner. The ID code of the smart tag is extracted from the radio signal. The scanner is said to compare the spectral content of the signal with a database of signatures and to derive the ID code. This method enables a read range of up to 30 m (typical 10-20 m). The system can operate in the 915 MHz band and 2.45 GHz band. RFSAW, Inc. (Dallas, Tex.) also provides minute Surface Acoustic Wave (SAW) RFID devices that can be used within the scope of the present invention.

The antennae embedded within the smart tags 14 is generally one component of the device, though it is recognized that alternatives to antennas may exist in some applications. (For example, for some metallic objects, the smart tag need not comprise an antenna but the metallic object itself can serve as the antenna.)

The antennae embedded within the smart tags 14 may be a useful component of the device, though it is recognized that alternatives to antennas may exist in some applications. (For example, for some metallic objects, the smart tag need not comprise an antenna but the metallic object itself can serve as the antenna.) The excitation signal 18 from the scanner 16 must be received by the antennae to "activate" the smart tag. The received excitation signal 18 is the power source for the smart tag 14 and results in the generation of the electromagnetic pulse containing the coded food product information signal 20. A detailed description of RFID smart tag antennas may be found in U.S. Pat. No. 6,320,556 B1, incorporated herein by reference for all purposes.

In an alternate embodiment, the smart tags 14 may be active devices. In this configuration, the smart tag 14 includes active transceiving circuitry that has the capability to selectively respond to coded request signals transmitted by a scanner 16. The active smart tag 14 may include the capability to receive and store additional information beyond the information contained in its fixed code. An active smart tag 14 requires an internal power supply, such as a micro-battery, thin film battery, or the like. For the embodiments wherein a consumer desires to enter food product information to the smart tags in addition to the "core" information provided with the packaged product, active tags would be necessary. For the embodiments wherein the smart tags 14 are provided with reusable containers, bags, and the like, it would be necessary to utilize active smart tags 14 which would allow the consumer to delete any old information stored on the tags 14 and enter new desired information.

Figure 2:
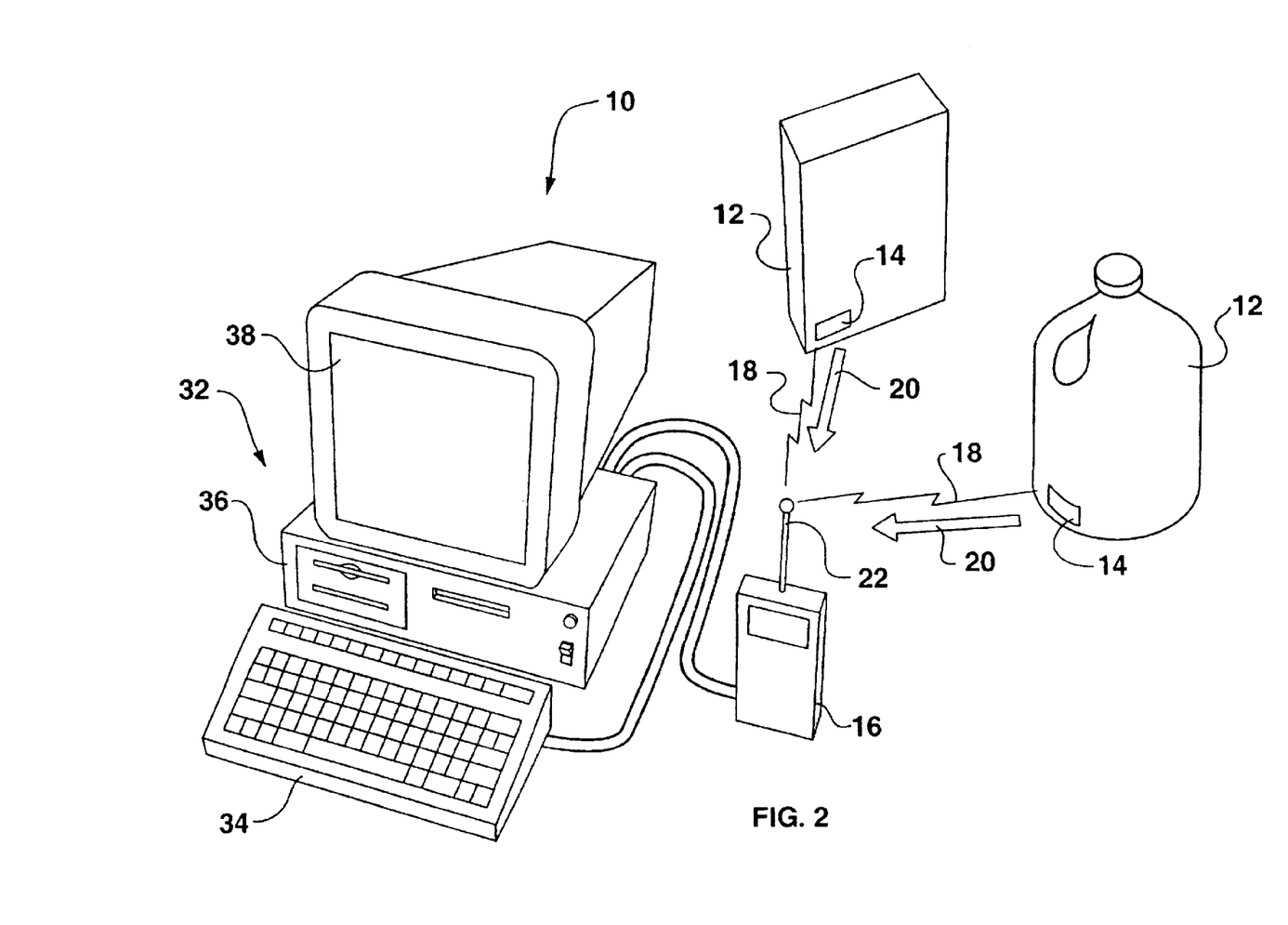
FIG. 2 is a graphic illustration of an embodiment of the system according to the invention integrated with a computer system.

The food product information signal 20 may include a link or code to a remote database having additional food product information. This link or code may enable the scanner 16 to communicate with such database by conventional wireless technology. For example, the signal 20 may include a URL code to launch an Internet browser application. In this way, the scanner 16 may provide the consumer with Internet access to websites containing additional information about the food product. In this embodiment, the scanner 16 is also an internet accessible wireless device, such as a PDA (personal data assistant), or is configured with an Internet accessible computer system 32 (FIG. 2). A keyboard 30 may be provided with the scanner 16 for interactive communication via the Internet. The websites may be maintained by, for example, the manufacturer, supplier, or vendor of the food product.

The RFID scanner 16 may be of conventional hardware and software architecture. The scanner 16 receives the coded food product information signal 20, and decodes the signal into usable commands and data. The scanner 16 includes a microprocessor and software programs for this purpose. The scanner 16 provides an output to the consumer that may be in various forms. For example, the scanner 16 may visually display the freshness or expiration date of the food product 12 by way of a visual display screen 24, printout, or the like. Alternatively, the scanner 16 may include any configuration of visual or audible alarm 28 to automatically alert the consumer if the food product 12 that is about to be placed in the storage location, or a food product in storage, has expired or is otherwise undesirable. In an alternative system, the scanner 16 may be used to scan the products as they are removed from storage and provide similar information.

In a somewhat more sophisticated embodiment as conceptually illustrated in FIG. 2, the scanner 16 is operationally configured with a computer system 32 of any conventional hardware/software architecture. The computer system 32 may incorporate a monitor 38, CPU 36, and keyboard 34. It should be appreciated that the scanner 16 may also be a "computer" in that it has its own microprocessor, display 24, and data entry keypad 30. Such components can be combined with the scanner 16 as a single device, or can be separated but in cooperative association (e.g., the display 24 can be a remote screen). The computer configuration provides a number of options to a consumer, restaurant manager, warehouse facility, and virtually any person or facility having to store food products for a period of time. For example, in one conceivable scenario, the computer may store food product profiles that are specific to an individual. This profile may include, for example, an individual's food allergies, food preferences, nutritional requirements, dietary requirements, medications or medical conditions, and the like. If the scanned food product 12 contains an ingredient that conflicts with an individual's food product profile, the system 32 may emit any suitable alarm or alert as the food product is placed into or taken from the storage location, as well as a visual explanation or indication as to the reason for the alarm. For example, a patient in a medical care facility, patron in a restaurant, children in school, and so forth, may be highly allergic to peanut oil. The system 32 may issue an alert if peanut butter is placed into or taken from storage warning that the food product should not be served to the particular individuals. Food conflicts with medical conditions or medications can be tracked in this way as well. Any number of scenarios are conceivable in this regard. In one embodiment, the alarm can comprise a narrow beam of sound targeted to the consumer or other individual, using hypersonics sound technology from American Technology (San Diego, Calif.), as described more fully in a white paper, "Theory, History, and the Advancement of Parametric Loudspeakers: A Technology Overview," by James J. Croft and Joseph O. Norris, Revision D, American Technology Corporation, San Diego, Calif. , 2002, available at http://www.atcsd.com/pdf/HSSWHTPAPERRevD.pdf. Exemplary applications of hypersonic technology are illustrated at www.popsci.com/popsci/hometech/article/0,12543,351353,00.html.

Figure 3:
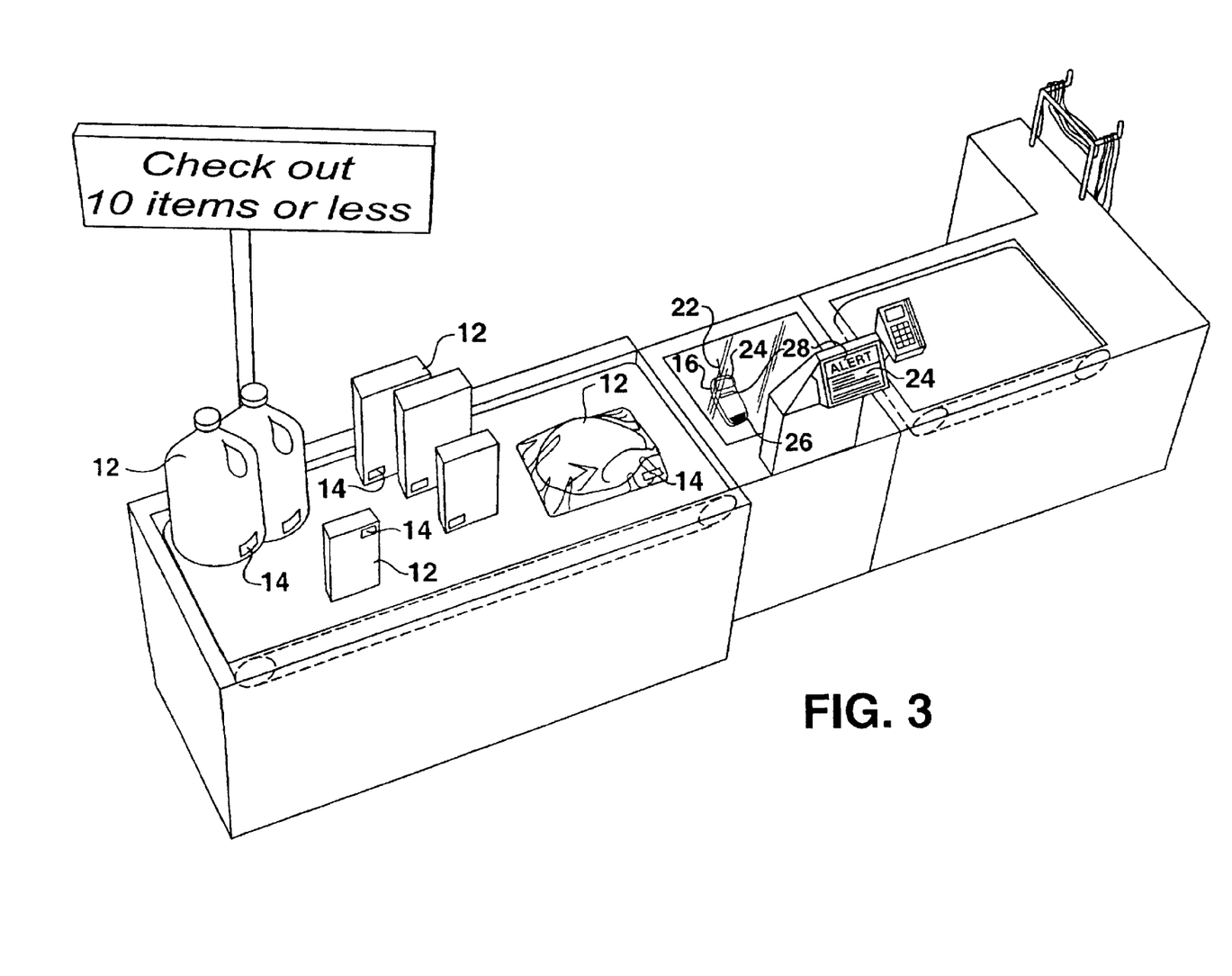
FIG. 3 is a graphic illustration of an alternative method and system according to the invention.

FIG. 3 conceptually illustrates an alternative supermarket scenario wherein the scanner 16 is provided at a point of checkout, such as at the sales register and incorporated with a conventional bar code scanner. As the food products 12 are conveyed past the scanner 16, the scanner determines if any such product 12 has expired or is no-longer "fresh." If such an expired product 12 is scanned, an alert or alarm 28 may activate and/or the visual display 24 may identify the offending food product 12. With active smart tags 14, the scanner 16 may also add information to the tags as they are being scanned, for example the purchase date of the product.

Figure 4:
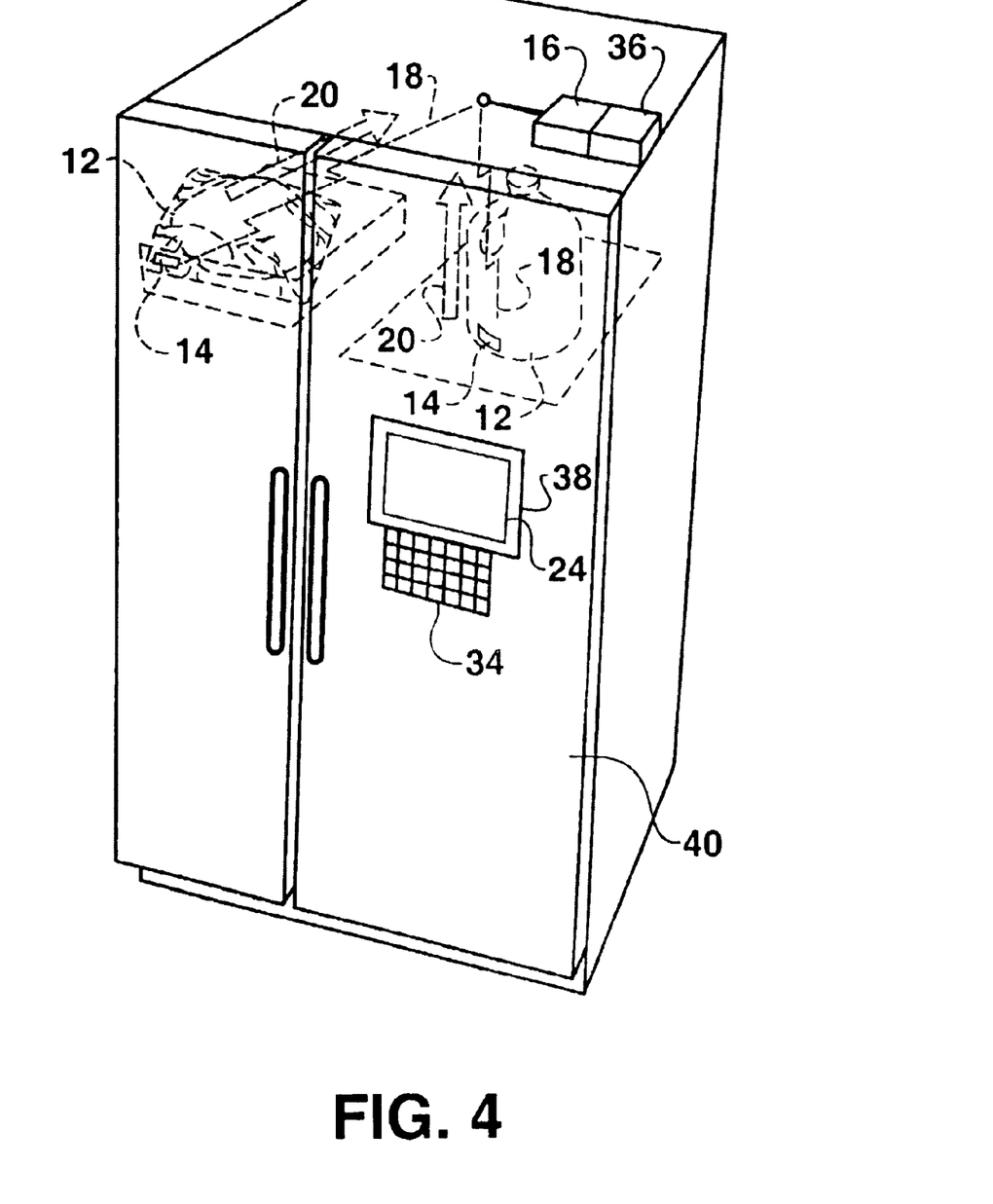
FIG. 4 is a graphic illustration of a conventional refrigerator incorporating a system and methodology according to the invention.

FIG. 4 conceptually illustrates a conventional home refrigerator 40 incorporating a system and methodology according to the invention. The refrigerator 40 may be used to store any manner of food products 12 having smart tags 14 associated therewith. A scanner/transmitter 16 and associated CPU 36 are conspicuously provided so as to scan the products 12 as they are placed in or removed from the unit 40. A monitor 38 having a visual display may be built into a door panel of the unit 40. The system 10 may perform any of the functions described above. This configuration may provide particular benefits to the home maker. The system may automatically emit an alert when stored food products 12 have expired. The contents of the unit 40 can be displayed via the display 24 without the unit being opened. The stored products 12 can be displayed by dates made, dates put into the unit 40, food groupings, and so forth. The system may have stored recipes or preparation instructions for the products 12, or provide an Internet link to a web site containing such information. For example, a homemaker may be able to determine what is in the freezer and how to prepare it without ever opening the freezer door. Various other functions and benefits will be apparent to those skilled in the art.

It should be appreciated that the scanner 16 and/or associated computer system 32 can be configured to accommodate consumers having visual impairment, language difficulties, illiteracy, etc. For example, the scanners may be configured with audible or visual alarms that indicate when a scanned food product 12 has expired or is no longer considered fresh. The scanner 16 may contain a visual display 24 that conveys the food product information in different languages. The scanner 16 may emit voice messages in selected foreign languages. Various configurations of the scanner 16 in this regard are within the scope and spirit of the invention.

PROPHETIC EXAMPLE

A meat storage facility at a butcher shop or meat processing plant may add smart tags to a portion of the carcass of an animal that may be discarded prior to final packaging of meat products. For example, a removable plastic tag may comprise a smart tag with a unique identification code for the carcass, and may comprise sensors that track temperature or other parameters, if desired. A scanner in the storage location initially reads the smart tag and creates a record in a database indicating that a tagged carcass is present. An operator or an automated system may add additional information to be associated with the database entry for the carcass (i.e., to be associated with the identification code from the smart tag), such as the carcass weight, its origin, the type of animal, its age and weight when slaughtered, the slaughterhouse where it was processed and the date of processing, various measures of quality (e.g., "carcass merit," fat content, degree of marbling, and the like), the animal's feed history, intended uses of the carcass (e.g., intended customer or shipping destination, or use for human or pet food), presence of growth hormones, history of antibiotic treatments, presence of engineered genes, and the like.

Sensors that track temperature, humidity, *E-coli* levels, and other parameters may be in the storage facility and can continually or periodically provide signals that are entered into a database and associated with the identification code of the carcass. Entry of the data can be automated or can occur through human action such as manually entering data into a database. Thus, data is associated with the identification code for the carcass that provides a temporal history of the conditions to which the carcass has been exposed, its storage location, as well as other data related to quality and origin of the carcass. A single server can receive data from sensors in the storage facility that can be coupled with the date and time and a location code for the storage facility, and date and time from the RFID scanner, which provides products codes that can also be associated with the location code for the storage facility and the date and time. Information about environmental conditions in the storage facility can be looked up for a particular date and time by providing a query with the location code and the date and time. Thus, sensor data can be used to provide an environmental history of the carcass since the carcass is also associated with a location code and date and time information.

The selection of carcasses for conversion to packaged meat products can be done based on age data derived from RFID scans. For example, the meathooks carrying the carcasses can be on a conveyor system that allows carcasses to be presented for further processing based on age (e.g., oldest first) or based on other criteria for the products to be prepared. Thus, a butcher can automatically presented with a suitable carcass to prepare products for a particular customer.

When the carcass is converted to packaged meat products, new smart tags can be attacked to the package products with identification codes that are also associated in a database with the identification code and/or data associated with the original carcass. The packaged products can also be associated with sensor data for storage temperature and location, and other data, by associating such data in a database with the respective smart tag identification codes of the products. A grocer or, optionally, consumer, may then be able to track the packaged products in order to determine its freshness, the conditions and length of storage, its origin, carcass handling procedures, or any other desired factors, to ensure that the product is safe. If there are quality concerns or problems, a consumer may provide the smart tag or an identification code to the grocer or other party, who may then retrieve pertinent data and identify and correct factors possibly related to the problem.

A smart tag on a carcass or a packaged meat product may be combined with an environmental sensor or other "smart labels" such as Vitsab® TTI Indicators of Cox Technologies, Inc. (Belmont, N.C.), which use enzymatic color change indicators to provide an indication of temperature exposure for a product. These environmental sensors are described more fully at www.vitsab.com/htdocs/VITsummary.htm and www.vitsab.com/htdocs/VITtechnical.htm.

The grocer may use an RFID scanner to scan packages on the shelves and determine the age of products. The grocer's computer system may recommend that discounts be offered on products before they reach an expiration date in order to ensure that they sell before becoming unacceptable. Alternatively, a consumer may use an RFID scanner to rapidly locate the freshest packaged products or products that confirm to criteria established by the consumer (e.g., no growth hormones present, or only domestic meat, etc.). The consumer's RFID scanner may be provided by the grocer and given limited access to product information, or may belong to the consumer and provided limited or full access to grocer product data as a free or premium service. Data obtained by the consumer from scanning the RFID tag of the product may be transferred to a home computer system when the consumer brings the product home, where the consumer's smart-tag enabled refrigerator may further monitor temperature exposure history of the product, optionally coupled with consumer-entered data such as the estimated temperature and time for transit of the product from the grocer to the consumer's home.

In one embodiment, the consumer uses a voice recording and/or speech recognition system to enter spoken information into the consumers RFID-enabled system as the meat is placed in the refrigerator or after the meat has been removed from its packaging and placed in another container. For example, hamburger may be converted to meatloaf and placed in a container with a permanent or temporary smart-tag. The consumer may place the container into a smart-tag responsive refrigerator. The consumer may then choose to continue associating the previously acquired information about the raw hamburger with the meatloaf product, and/or may enter new information. The refrigerator system may prompt the consumer for input, or the consumer may press a button or activate other means for receiving input to be associated with the smart tag of the container, whereupon the consumer can speak to give a description of the contents and, optionally, to give a command to associate the recent entry for raw hamburger with the meatloaf, such that the history of one or more raw materials in a prepared dish can be tracked.

The recorded voice may be associated directly with the smart tag, such that a computer system associated with the refrigerator may, upon removal of the container, replay the spoken description of the contents and the date of first entry into the refrigerator. Alternatively or in addition, the spoken message may be recognized and converted to text that is associated with the smart tag (i.e., associated with the identification code of the smart tag of the container in a database or list), such that the user can view textual information on a display screen or other means to show the meatloaf information and information for other food items in the refrigerator and their dates of entry, number of times they have been removed and length of time out of the refrigerator, recommended discard date, etc. The spoken message upon entry of a container into the refrigerator could be, for example, "Meatloaf, greasy, extra garlic, made from item 462—use before October 20," which may then be converted to a description of the contents in a description field of a database, and a discard date in a discard date field of a database, plus an association with item 462 (the raw hamburger for which other data is already available). When the discard date approaches, the consumer can be alerted that the container needs to be removed and the contents used or discarded. This may be facilitated by locating the container for the consumer or giving a description of the container, which may have been previously described by a voice message when it was associated with a smart tag. Thus, the consumer may here a message upon opening the refrigerator: "Alert: Your mealoaf, greasy, extra garlic in the blue plastic container expires tomorrow." A visual alert can also be provided on a display screen.

It should also be appreciated that the system and method according to the invention is not limited to any particular application or commercial business, but has application wherever food products are stored for a period of time before use or consumption. For example, the system has beneficial applications in hospitals, nursing homes, and other health care establishments, schools, restaurants, warehouse, food processing and preparation plants, and any other location or environment wherein relatively large quantities of food products are stored for any number of reasons.

It should be appreciated by those skilled in the art that the system and method according to the invention have wide applications, and that the example and embodiments set forth herein are merely exemplary. It is intended that the present invention include such uses and embodiments as come within the scope and spirit of the appended claims.

What is claimed is:

1. A method for tracking the freshness or expiration dates of food products put into storage, said method comprising:

providing food products placed into storage with smart tags, the smart tags being associated with food product information wherein said food product information comprises at least one of product identification data, freshness data, or expiration date data;

scanning the food products that are placed into storage with a smart tag scanner, the scanner configured to retrieve the food product information associated with the smart tags;

storing the food product information for the food products in storage;

storing a voice message and associating said voice message with said food product information; and alerting the user when the retrieved food product information indicates that at least one of the following events has occurred:

(a) a food product in storage is expired;
(b) a food product in storage no longer fresh; and
(c) a food product being placed into storage has expired or is no longer fresh.

2. The method as in claim 1, wherein the scanner is disposed at a point of entry of the food products into storage.

3. The method as in claim 1, wherein the smart tags are incorporated with packaging of the food products.

4. The method as in claim 3, wherein the smart tags are passive tags and the food product information is entered into the tags by one of the manufacturer, supplier, and vendor of the food product.

5. The method as in claim 3, wherein the smart tags are passive tags with an identification code that is associated with food product information provided externally on data storage means.

6. The method as in claim 1, wherein the smart tags are incorporated into a reusable container.

7. The method as in claim 1, wherein the scanner gives a visual display of at least a portion of the retrieved food product information to the user.

8. The method as in claim 1, wherein the scanner alerts the user with any combination of visual or audible alarm upon occurrence of any one of said events.

9. The method as in claim 1, wherein said scanner is functionally integrated with a computer system, the computer system providing the user with a variety of options based on the food product information retrieved from the smart tags.

10. The method as in claim 1, comprising sorting the food product information to display the stored products by date.

11. The method as in claim 10, wherein the date is one of the date the food product expires or is no longer fresh, the date the food product was purchased, or the date the food product was placed into storage.

12. The method as in claim 10, wherein the date is the date the food product was placed into storage.

13. The method as in claim 10, comprising sorting the food product information to display the stored products by type or food group.

14. The method as in claim 1, wherein the smart tags are active tags such that additional information may be added to or deleted from the tags.

15. The method as in claim 14, wherein the additional food product information is automatically added to the smart tags by a transmitter at a point of purchase of the food products.

16. The method as in claim 15, wherein the additional food product information includes the date purchased.

17. The method as in claim 14, wherein the additional food product information is added by a user prior to placing the food product into storage.

18. The method as in claim 14, wherein the scanner is functionally integrated with a computer system that provides the user with interactive capabilities to add or delete information in the smart tags and to manipulate the food product information retrieved and stored from the smart tags.

19. The method as in claim 1, wherein the food product information includes a link to a remote database having information regarding the food product.

20. The method as in claim 19, wherein the scanner accesses the remote database and displays information therefrom to the consumer.

21. The method as in claim 20, wherein the remote database is an Internet site, the scanner being an Internet accessible device or functionally configured with an Internet accessible computer system.

22. The method as in claim 1, wherein the smart tags are provided with storage containers in which consumers place food products to be stored.

23. The method as in claim 22, wherein the smart tags are active tags, the consumer entering the food product information in the tags or associated with the tags, prior to placing the food products into storage.

24. The method as in claim 1, wherein the consumer provides said voice message by speaking a message into a voice recording system.

25. The method as in claim 1, wherein said voice message is a synthesized voice message.

26. The method as in claim 1,wherein the customer is presented with food product information for a item-of-interest after sneaking a product identification phrase into a voice recognition system.

27. A system for tracking the freshness of a food item in a storage location, comprising:

an RFID tag comprising an RFID code associated with product information for the item, the RFID tag being associated with the item in the storage location;

an RFID scanner cooperatively associated with the storage location adapted for scanning the RFID code from the smart tag and retrieving the associated product information;

a processor associated with data storage means for recording storage information pertaining to the item;

a voice recording system associated with said processor for recording a custom voice message wherein said custom voice message is associated with said RFID code;

means for comparing the storage information with predetermined criteria for the item to determine the freshness state of the item;

means for automatically recommending or causing an action to be taken with the item responsive to the freshness state of the item; and means for a consumer to review storage-related information comprising at least a subset of the recorded storage information or the freshness state information derived from the storage information.

28. The system of claim 27, wherein a plurality of items are tracked, each item comprising an RFID tag associated with its respective product information.

29. The system of claim 27, wherein the storage location is refrigerated.

30. The system of claim 27, wherein the means for a consumer to review storage-related information comprises a consumer-operated RFID scanner adapted for scanning a product RFID tag associated with a product comprising or derived from the item, said product RFID tag comprising information associated with the storage-related information, said RFID scanner cooperatively associated with display means for displaying the storage-related information.

31. The system of claim 27, wherein the smart tag is attached to a container.

32. The system of claim 27, wherein the smart tag is attached to the food item.

33. The system of claim 27, wherein means for automatically recommending or causing an action to be taken comprise means for issuing an audible or visible alert indicating that the food is not fresh.

34. A method of associating information with items placed into a storage location, said method comprising:
    associating a first electronic tag with a unconverted item placed into storage, the first electronic tag configured for storing item-information wherein said item-information comprises at least one of identification data, freshness data, or expiration data;
    scanning said first electronic tag with an electronic scanner, the scanner configured to retrieve at least part of the item-information stored in said first electronic tag;
    storing the retrieved item-information in a memory associated with said electronic scanner;
    prompting a user to provide an item-voice-message wherein said item-voice-message is stored in said memory and associated with at least part of said retrieved item-information; and
    presenting said item-voice-message to a user when at least one of (a) an item is taken out of storage, (b) automatically when item-information is presented to a user, or (c) when requested by a user.

35. A method of associating information with items placed into a storage location as in claim 34, wherein said electronic tag is an RFID smart tag and said electronic scanner is an RFID smart tag scanner.

36. A method of associating information with items placed into a storage location as in claim 34, further comprising the step of evaluating said retrieved item-information and alerting the user when an item has experienced an item-event, said item-event comprising at least one of (a) an item has been in storage for a predefined period time, (b) the current date is greater than an item's expiration date, (c) the current date is greater than an item's freshness date, or (d) an item's identification data indicates the item may not be safe.

37. A method of associating information with items placed into a storage location as in claim 36, wherein the user is further alerted when the retrieved item-information indicates that an item being placed into storage has expired or is no longer fresh.

38. A method of associating information with items placed into a storage location as in claim 34, wherein said item-voice-message is a spoken message provided by said user by speaking into at least one of a voice recording system or a speech recognition system associated with said electronic scanner and said memory.

39. A method of associating information with items placed into a storage location as in claim 34, further comprising the steps of:
    associating a second electronic tag with a converted item, said converted item comprising at least a portion of said unconverted item;
    said second electronic tag configured for storing item-information associated with said converted item, wherein said item-information comprises at least one of identification data, freshness data, or expiration data;
    associating at least part of the unconverted item's item-information with said converted item's item-information;
    requesting a user to provide an item-voice-message; and
    associating said item-voice-message with said converted item's item-information.

40. A method of associating information with items placed into a storage location as in claim 34, further comprising the step of converting said spoken message into a text message and presenting said text message to a user when at least one of (a) an item is taken out of storage, (b) automatically when item-information is presented to a user, or (c) when requested by a user.

41. A method of associating information with items placed into a storage location as in claim 34, further comprising the steps of:
    requesting the user to provide a voice-tag, said voice-tag being a voice-message to be used to identify at least one item in storage;
    storing the user provided voice-tag in said memory and associating said voice-tag with the item-information for at least one item in storage;
    detecting when a user speaks a voice-tag; and
    presenting the user with at least part of the item-information associated with the voice-tag.

42. A system for associating information with items placed in a storage location, comprising:
    at least one electronic tag configured for storing item-information associated with an item;
    an electronic scanner cooperatively associated with a storage location and adapted for retrieving information stored in said at least one electronic tag;
    a processor associated with said electronic scanner;
    an audio system associated with said processor, said audio system comprising components for playing an audio message and recording an audio message;
    at least one memory associated with at least one of said processor or said audio system;
    wherein said processor is configured to use said electronic scanner to retrieve at least part of the item-information stored in at least one electronic tag associated with an item-of-interest, said item-of-interest being one of (a) an item being placed into a storage location, or (b) an item located in a storage location;
    wherein said processor is further configured to store at least part of the retrieved item-information in said memory;
    wherein said audio system is further configured to record a user generated message;
    wherein one of said processor or said audio system is configured to store said user generated message in said memory in one of digital form or analog form; and
    wherein said processor is further configured to associate said user generated message with at least part of the retrieved item-information for the item-of-interest.

43. A system for associating information with items placed in a storage location as in claim 42, wherein said electronic tag is an RFID smart tag and said electronic scanner is an RFID smart tag scanner.

44. A system for associating information with items placed in a storage location as in claim 42, wherein the processor is further configured to present an audio-message associated with an item upon the occurrence of at least one of (a) removing the item form the storage location, (b) a manual user request for item-information about an item, or (c) automatically in response to a general user request.

45. A system for associating information with items placed in a storage location as in claim 42, further comprising:
    voice recognition technology associated with said processor;
    wherein said voice recognition technology is further configured to receive an item-voice-tag, said item-voicetag being an spoken message used to identify an item and wherein said item-voice-tag comprises one of a synopsized audio message or a recording of a message spoken by the user;

wherein the processor is further configured to store said item-voice-tag in said memory and associate said item-voice-tag with at least part of the item-information stored in memory for said item; and wherein the processor is further configured to present at least part of the item-information associated with an item-voice-tag when said voice recognition technology detects that said item-voice-tag has been spoken.

* * * * *